United States Patent [19]

Matsuo et al.

[11] Patent Number: 4,981,746

[45] Date of Patent: Jan. 1, 1991

[54] HEAT-SENSITIVE STENCIL SHEET

[75] Inventors: Makoto Matsuo, Chiba; Ryohei Takiguchi, Kashiwa; Masayuki Ando, Yokohama; Mitsuru Tsuchiya, Omiya; Seiji Take, Nagareyama; Kazue Ikarashi, Shinjuku; Kenichi Takeda, Nagareyama, all of Japan

[73] Assignee: Dai Nippon Insatsu Kabushiki Kaisha, Japan

[21] Appl. No.: 350,748

[22] PCT Filed: Aug. 26, 1988

[86] PCT No.: PCT/JP88/00850

§ 371 Date: Apr. 27, 1989

§ 102(e) Date: Apr. 27, 1989

[87] PCT Pub. No.: WO89/01872

PCT Pub. Date: Mar. 9, 1989

[30] Foreign Application Priority Data

Aug. 27, 1987 [JP] Japan .............................. 62-211443
Feb. 9, 1988 [JP] Japan .............................. 63-26584

[51] Int. Cl.[5] .............................. B32B 9/00

[52] U.S. Cl. .............................. 428/195; 428/212; 428/913; 428/914; 156/60; 430/495; 430/945

[58] Field of Search .............. 428/195, 212, 913, 914; 156/60; 430/495, 945

[56] References Cited

U.S. PATENT DOCUMENTS 3,924,041 12/1975 Miyeyama .............................. 428/216

FOREIGN PATENT DOCUMENTS 61-40196 2/1986 Japan .
1164896 7/1986 Japan .
62-94390 4/1987 Japan .

*Primary Examiner*—Patrick Ryan
*Attorney, Agent, or Firm*—Parkhurst, Wendel & Rossi

[57] ABSTRACT

The heat-sensitive stencil sheet of the present invention is a heat-sensitive stencil sheet including a thermoplastic film (3) laminated through an adhesive layer (2) on one surface of a porous base (1). The adhesive layer includes an ionizing-radiation-curable adhesive, and therefore the above porous support (1) and the thermoplastic film (3) can be rapidly and firmly adhered together, and yet printing resistance during printing can be improved simultaneously with the additional excellent effect of making the printed image sharper.

23 Claims, 1 Drawing Sheet

HEAT-SENSITIVE STENCIL SHEET

TECHNICAL FIELD

This invention relates to a heat-sensitive stencil sheet and a method for producing the same, more particularly to a high performance heat-sensitive stencil sheet and an economical method for producing the same.

BACKGROUND ART

The stencil printing system has heretofore been broadly practiced as a simple printing system. According to this stencil printing system, a laminate having a thermoplastic film layer laminated on an appropriate support (base) surface such as paper, etc. is used as the heat-sensitive stencil sheet. By performing printing by a heating printing means such as thermal heads on the paper, the thermoplastic film layer is melted by heating to form a perforated pattern corresponding to the printed information for printing. In stencil printing, the film layer side of the paper having printing thus effected thereon, is superposed on a material to be printed such as paper, etc. and a printing ink is fed in from the base side.

The heat-sensitive stencil sheet to be used in the heat-sensitive stencil printing system of the prior art as described above is generally formed by laminating a thin thermoplastic film layer of about several μm on the surface of a porous base such as paper, etc. with an adhesive, etc. but the following problems are involved.

(1) Since the adhesive layer is also required to be thermoplastic for enabling perforation with heat, no strong adhesive such as a thermosetting adhesive can be used, and therefore no sufficient adhesive force can be obtained. Also, for the same reason, during printing, the adhesive force will be lowered due to the solvent components, etc. in the printing ink, whereby there is the problem that poor print quality may occur if the thermoplastic film peels off from the layer due to the thermal head, etc. Thus, the heat-sensitive stencil sheet of the prior art has the problem that it is not satisfactory with respect to printing resistance.

(2) Since an organic solvent solution or emulsion of a thermoplastic resin is generally used as the adhesive, the required drying step and aging step make the process cumbersome, and also increase the cost. Also, the heat required in the drying and aging steps causes thermoplastic film to be deformed to make a stable paper product difficult to achieve Further, a solvent system, emulsion system adhesive, through impregnation into the porous support will clog the voids in the porous base, thereby having the drawback of being inferior in image quality or image density.

(3) As the result of use of a porous material such as paper, etc. as the base, it is necessary to enhance the adhesive force to some extent in order to adhere both sufficiently to each other. However, when the adhesive force between the support and the film layer becomes higher, the surface unevenness shape on the porous support will be transferred onto the surface of the thin thermoplastic film layer, whereby there is the problem of nonuniformity occurring on the printed image as caused by the uneven shape during printing.

An object of the present invention is to solve the drawbacks as described above, and provide an excellent heat-sensitive stencil sheet economically.

DISCLOSURE OF THE INVENTION

The above object of the present invention can be accomplished by the present invention as specified below.

More specifically, the present invention is a heatsensitive stencil sheet comprising a thermoplastic film layer laminated through an adhesive layer on one surface of a base, characterized in tht the above adhesive layer comprises an adhesive curable by ionizing radiation.

Thus, in the present invention, by using an adhesive curable by ionizing radiation as the adhesive for adhering the porous support and the thermoplastic film of the heat-sensitive stencil sheet, the support and the thermoplastic film layer are adhered sufficiently to each other, whereby an excellent printing resistance can be exhibited during printing.

Since the adhesive curable by ionizing radiation is of the non-solvent type, there is little impregnation of the solvent into the porous support to give excellent image quality and image density. Moreover, ionization radiation curing is possible at low temperatures, and therefore the sheet can be produced without causing any deformation of the thermoplastic.

Also, since the adhesive to be used has great adhesive force, the thermoplastic film and the base need not be adhered under high pressure, whereby there is no such drawback that the surface unevenness shape of the support is transferred onto the thermoplastic film layer side. Therefore, a printed matter with sharp images can be given.

Further, in the heat-sensitive stencil sheet of the present invention, drying and aging of the adhesive are obviated by use of an adhesive curable by ionizing radiation, and the adhesion step can be completed within several seconds, and therefore the production steps can be made continuous, and yet it is excellent in that a heat-sensitive stencil sheet can be provided economically.

BEST MODE FOR CARRYING OUT THE INVENTION

Referring now to preferred embodiments, the present invention is described in more detail.

Figure 1:
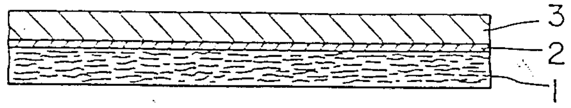
FIG. 1 and FIG. 2 are sectional views each showing the constitution of the heat-sensitive stencil sheet of the present invention.
Figure 2:
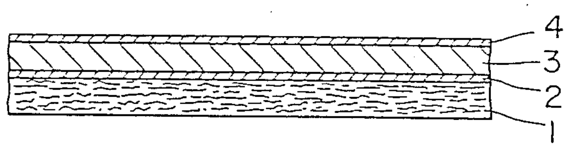
Figure 3:
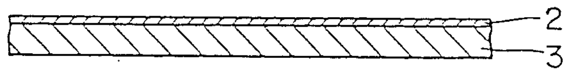
FIG. 3 and FIG. 4 are sectional views each showing the steps for preparing the heat-sensitive stencil sheet of the present invention.
Figure 4:
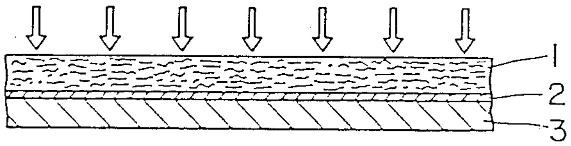

FIG. 1 and FIG. 2 illustrate schematically the cross-sections of the heat-sensitive stencil sheet of the present invention, and FIG. 3 and FIG. 4 illustrate schematically the method of preparing the heat-sensitive stencil sheet of the present invention.

As shown in the drawings, the heat-sensitive stencil sheet according to the first invention is characterized by a porous base 1 and a thermoplastic film layer 3 which are adhered with an adhesive curable by ionizing radiation 2, and the heat-sensitive stencil sheet according to the present invention characterized by forming further a sticking prevention layer 4 on the surface of the thermoplastic film layer 3, and further the third invention is characterized by first coating the thermoplastic film layer 3 with the adhesive curable by ionizing radiation 2 (FIG. 3), subsequently laminating the porous base 1 thereon and thereafter curing the adhesive 2 (FIG. 4) with the ionizing radiation (the arrowhead).

Porous base

The porous base 1 to be used in the present invention is required to be a porous material so that printing ink can pass therethrough during printing. For example, any base which can be used as the base for the heat-sensitive stencil sheet of the prior art can be used in the present invention, such as various papers, particularly porous papers such as Japanese paper, synthetic papers comprising chemical fibers (synthetic fibers) such as rayon, vinylon, polyester, acrylonitrile, etc., mixed papers made from chemical fibers and natural fibers, etc. Although not particularly limited, papers, synthetic fibers, mixed papers, etc. having a basic weight of, for example, about 8 to 12 g/m$^2$ can be used to advantage.

As the porous base to be used in the heat-sensitive stencil sheet of the prior art, natural fibers have been frequently used, but since natural fibers are generally inferior in printing resistance, it has been proposed to improve printing resistance by previously applying viscose working on the support (e.g., Japanese Laid-Open Patent Publications Nos. 92892/1987 and 156992/1987). However, according to the study by the present inventors, those having viscose working applied on a porous base comprising natural fibers ensues a new problem that the image density is lowered, and there are involved drawbacks such as the problem of shrinkage at the viscose worked portion and increases in production cost. The present inventors have repeated experiments in view of the above points to determine the following facts.

(a) Even when no viscose working or sizing treatment is applied by making the wet tensile strength of the material which becomes the base 200 g/15 mm or higher, more preferably 300 g/15 mm or higher, a heat-sensitive stencil sheet excellent in printing resistance and image characteristics can be obtained without giving rise to the accompanying drawbacks as described above. Thus, by enhancing the wet tensile strength, printing resistance and particularly deformation of the image by elongation of the paper can be effectively inhibited.

(b) In applying the viscose working, by use of a mixed paper of natural fiber and synthetic fiber as the support material, the wet tensile strength of the base can be improved to 200 g/15 mm or higher, more preferably 300 g/15 mm or higher, whereby the same effect as in the above (a) can be obtained. At the same time, even if viscose working may be applied, as different from the case when only natural fibers are employed, shrinkage of the paper can be reduced as far as possible to be excellent in the point that lowering of the image density can be prevented. Further, the mixed paper as mentioned above has large wet tensile strength and can lower the cellulose concentration during the viscose working (e.g. 20% or less), and therefore it is also possible at this point to effect reduction of the cost through increasing the image density.

In the present invention, the "wet tensile strength" as described above, means the strength at break obtained by soaking a paper cut into a width of 15 mm and a length of 250 mm in water of 20° C. for 10 minutes, then removing excessive water with a blotting paper and performing the tensile strength test before no change in moisture in the test strip occurs. The tensile strength was performed at a tensile speed of 50 mm/min. with a length between both the grip ends upon the initiation of the test being 180 mm.

Thermoplastic film

The thermoplastic film layer 3 to be laminated on the surface of the above support 1 is not particularly limited, but any of those used is the heat-sensitive stencil sheet of the prior art can be used, such as polyvinyl chloride type film, vinyl chloride-vinylidene chloride copolymer film, polyester film, polyethylene, polyethyleneterephthalate (PET), polyolefin film such as polypropylene, etc., polystyrene film, etc.

These thermoplastic film layers 3 should have a thickness of 20 μm or less, preferably 10 μm or less, more preferably 1 to 5 μm, so that perforation can be formed easily by the heating means of the thermal head, etc.

Whereas, in the present invention, of the materials as described above, as the material for the film layer 3, a polyester film having a thickness of 1 to 10 μm may be preferably used. As one of the particularly preferable polyester films, PET film may be mentioned, which has a heat shrinkage of 3 to 30% at 150° C. and 15 min. and/or a melting heat content of 5 to 10 cal/g and a melting point of 270° C. or lower. In the following, the reason why such PET film as mentioned above will preferable is to be explained.

Recently, for improvement of image quality of printed matter, the printing system using thermal heads has become the main stream, and the dot size tends to become smaller. Accordingly, the heat content per dot tends to become smaller, requiring that the stencil sheet has higher sensitivity. Also, the stencil sheet using polyethyleneterephthalate (PET) film as the thermoplastic film has high crystallinity and thermal stability due to the biaxially stretched PET film, and therefore has small perforations in the stencil prepared to give an excellent resolving power, but it has an insufficient density of the printed matter. Further, it is generally difficult to form the above polyvinyl chloride film or polyolefin film into a thin film of several μm, and it is also defective in heat resistance, making it unsatisfactory in both density and resolving power.

In the present invention, by use of a PET film having a heat shrinkage of 3 to 30% at 150° C. and 15 min. and/or a melting heat content of 5 to 10 cal/g, and a melting point of 270° C. or lower, particularly as the thermoplastic film, printing excellent in density and resolving power can be realized.

Such PET film has a thickness of 1 to 10 μm, preferably 1 to 4.5 μm, a heat shrinkage at 150° C. and 15 min. preferably of 3 to 30%, more preferably 5 to 20%, and also preferably its melting heat content of 5 to 10 cal/g, more preferably 6 to 9 cal/g, and a melting point of 270° C. or lower.

If the thickness of the PET film is less than 1 μm, the film itself is deficient in strength and also the elasticity becomes too great to stand lamination working or working during printing, while if the thickness exceeds 10 μm, much energy is required during perforation for melting the film and also the perforations become smaller to lower the density of the letters during printing.

A preferable area for perforations formed by perforation during stencil preparation may be 40 to 80% of the area of the thermal head, more preferably 50 to 70%. Generally during printing, the size of one dot of the printed matter becomes greater by 30 to 50% than the size of the above perforation. Accordingly, if the size of perforations exceeds 80% of the size of the thermal head, the individual points of the printed matter will be connected continuously to lower the resolution remarkably. On the other hand, if it is less than 40%, the individual points are too small, and a sharp image cannot be obtained.

If the heat shrinkage exceeds 30%, the perforation area after perforation in the thermal head becomes too large, whereby the adjacent perforations become connected continuously beyond the size of the thermal head to lower the resolving power. On the other hand, if it is less than 3%, the area of perforations after perforation is too small, and sharp printing can be obtained.

If the melting heat content exceeds 10 cal/g, the PET film has high crystallinity, whereby a large amount of energy will be required for melting perforation.

Adhesive layer

The adhesive to be used for adhesion between the above porous base 1 and the thermoplastic film 3 characterizes primarily the present invention, and an adhesive curable by ionizing radiation 2 is used in the present invention.

As the adhesive curable by ionizing radiation known in the art, there may be included primarily polymers having radical polymerizable double bonds in the structure, for example, relatively lower molecular weight polyester, polyether, acrylic resin, epoxy resin, urethane resin, etc. containing (meth)acrylate and radical polymerizable monomer or polyfunctional monomer etc., further containing optionally a photopolymerizable initiator to be crosslinked by polymerization with electron beam or UV-ray, and these adhesives curable by ionizing radiation, of the prior art can be all used in the present invention.

However, those particularly preferred in the present invention are those capable of forming an adhesive layer which can retain heating meltability even after ionizing radiation curing. Such adhesive layer can be formed from an ionizing radiation curable adhesive having relatively lower crosslinkability. Preferably, available ionizing radiation curable adhesives contain a coating forming component as the main component, and do not necessarily require the presence of double bonds in the molecule, having relatively lower molecular weights, for example, containing a thermoplastic resin such as polyester resin, polyvinyl acetate resin, ethylene-vinyl acetate copolymer resin, chlorinated polypropylene, polyacrylate, terpene resin, coumarone resin, indene resin, SBR, ABS, polyvinylether, polyurethane resin having a molecular weight of about 400 to several ten thousands as the main component. These thermoplastic resins have been also known in the art as the heat-sensitive adhesives, and these heat-sensitive adhesive layers can be preferably used in the present invention.

Further, in addition to the above components, for improvement of the heating meltability of the adhesive layer formed, a wax type polymer, oligomer having a relatively lower melting point, for example, polyethylene glycol, polypropylene glycol, paraffin, aliphatic polyester, parablex, polyethylene sebacate, polyethylene adipate, etc. may be also added, and these waxes can be also used in place of the above thermoplastic resin.

In the present invention, since coatability during formation of the adhesive layer is inferior with the above thermoplastic resin and/or waxes alone, and also the adhesive of the adhesive layer is deficient it is preferable to improve coatability by using a monofunctional monomer such as vinyl type monomers, for example, (meth)acrylate, (meth)acrylamide, allyl compound, vinyl ethers, vinyl -esters, vinyl heterocyclic compounds, N-vinyl compounds, styrene (meth)acrylate, crotonic acid, itaconic acid, etc. Further, in addition to the above monofunctional monomer, bifunctional or more monomers such as diethylene glycol di(meth)acrylate, triethylene glycol di(meth)acrylate, tetraethylene glycol di(meth)acrylate, trimethylolpropane tri(meth)acrylate, pentaerythritol tetra(meth)acrylate, dipentaerythritol hexa(meth)acrylate, tris($\beta$-(meth)acryloyloxyethyl)isocyanurate, etc., but if these polyfunctional monomers are used in large amounts, the thermal perforatability of the adhesive layer is lowered, and therefore they should not be used in large amounts. When used in small amounts, for example, 10% by weight or less in the whole monomers, preferably in an amount of 5% by weight or less, excellent adhesive force and printing resistance can be achieved without obstructing the thermal perforatability of the adhesive layer.

Further, in the present invention, good thermal perforatability can be also given to the adhesive layer after curing by controlling increase in molecular weight or crosslinking during curing of the adhesive layer by adding a small amount of a known chain transfer agent such as a mercaptan compound in the above adhesive.

The composition of the above ionizing radiation curable adhesive to be used preferably in the present invention may be preferably a composition which is nonfluid having some adhesiveness (tackiness) at normal temperature, and a fluidizable liquid having a viscosity of about 500 to 2,000 cps under temperature elevation, for example, at a temperature of 60 to 100° C. For example, a composition containing about 1 to 30 parts by weight of a monomer based on 100 parts by weight of the above thermoplastic resin and/or waxes.

As described above, as the ionizing radiation curable adhesive of the present invention, it should preferably consist of a composition containing (a) a thermoplastic resin and (b) a monomer and/or a low melting wax. Also, in the preferred embodiment of the present invention, a composition containing a thermoplastic resin having a molecular weight of about 1000 to 30,000, a monofunctional (meth)acrylate monomer and a low melting wax having a melting point of 40 to 150° C. is preferred.

Ordinarily, a thermoplastic resin cannot be coated unless diluted in a solvent. Accordingly, there are problems that (1) lamination working can be done only with difficulty, (2) the resin is impregnated into the porous base to clog the ink passage holes, (3) the working speed is slow, (4) the air is polluted with the solvent, (5) the adhesive force during hole opening (namely during formation of perforation pattern in the thermoplastic layer) is low.

On the other hand, there has been also known an adhesive comprising a wet curable type polyurethane, but in this case, there are problems that (1) a long time is required for curing, (2) the pot life is short, (3) hole opening by the heat mode is difficult, and (4) coating viscosity is high, whereby thin film coating is difficult.

In the present invention, as described above, by using a composition containing (a) a thermoplastic resin and (b) a monomer and/or a low melting wax as the ionizing radiation curable adhesive, the above problems can be solved, and an adhesive with great working speed, easy lamination, having excellent printing resistance and also hole opening by heat can be provided.

As the thermoplastic resin in this case, as described above, a polymer such as polyester, polyurethane, polycarbonate, epoxy resin, polyvinyl acetate, polyacrylate, polystyrene, etc. can be used. It is not preferable for the image that 2 or more double bonds are contained in one molecule of these molecules. The molecular weight should be preferable lower as about 1000 to several ten thousands in working and image characteristics. Also, for the purpose of improving the heating meltability and easy lamination working, a wax having a relatively lower melting point, for example, 40 to 150° C., can be added.

Among the above thermoplastic resins, a polyester or a polyurethane may be preferably employed, particularly one which is solid at normal temperature and has no crystallinity. Further, in the case of polyurethane, it should preferably have a high agglomerating force and a molecular weight of 400 to 10,000 in working adaptability. Such low molecular weight is excellent in fluidity during heating, and is also excellent in agglomerating force during normal temperature.

On the other hand, as the monomer, a monofunctional monomer, for example, (methy)acrylate, (meth)acrylamide can be used. Printing resistance can be improved by adding a bifunctional monomer to these monomers, but care should be paid to add no excessive amount of such monomer, because the image characteristics may be considerably lowered thereby. Such polyurethane resin can be synthesized by use of conventional isocyanates, TDI, MDI, IPOI, etc. with various diols such as 1,4-butane diol, polyester diol, polyether diol. At the terminal ends, at most one acryloyl group may be also introduced with 2-hydroxyethyl acrylate, N-hydroxymethylacrylamide, etc.

The effects concerning the above embodiments may be summarized as follows.

(1) By use of a thermoplastic resin which has a low molecular weight and is solid at normal temperature, fluidity at high temperature can be exhibited to give excellent perforatability. Also, the viscosity is low during coating, and there is the advantage of easy workability in this respect. For this purpose, the polyurethane resin as described above is the most preferred.

(2) In the base of a wax with a low melting point, fluidity during heating can be improved to improve perforatability, whereby adhesion between the above thermoplastic film and the porous base becomes better during preparation of the stencil of the present invention.

(3) The monofunctional monomer controls the viscosity during working, whereby not only working adaptability is imparted, but it is also suitable for imparting adhesiveness without imparting perforatability during printing, because it can be adequately impregnated into the porous base.

(4) Because no solvent as in the prior art is required to be used, where there is no problem of pollution of the air, and also, since the amount impregnated into the porous support can be reduced, the pores in the porous base will not be clogged unnecessarily.

(5) On account of the ionizing radiation curable type, the production speed is extremely rapid, and also curing at low temperatures is possible. For this reason, as compared with the case when the adhesive of the prior art is employed, the problems caused by heat (for example, generation of curl) can be eliminated.

(6) On account of the ionizing radiation curable type of adhesive, adequate crosslinking can be formed in the adhesive layer. Accordingly, perforatability during printing will not be impaired by the presence of the adhesive layer, whereby a heat-sensitive stencil sheet having excellent printing resistance can be provided.

Adhesion of porous support with thermoplastic film

The heat-sensitive stencil sheet of the present invention can be obtained by adhering the above thermoplastic film layer 3 with the base 1 with the above ionizing-radiation-curable adhesive.

The above ionizing-radiation-curable adhesive should be coated rather on the thermoplastic layer 3 than on the base 1 side. This is because if the ionizing-radiation curable-adhesive given with adequate fluidity by heating is applied on the porous base 1 side, the ionizing-radiation-curable adhesive will be impregnated into the base 1, so that a good adhesiveness cannot be obtained.

The coating method itself may be any of blade coating, gravure coating, knife coating, reverse roll coating, spray coating, offset gravure coating, kiss coating, etc., and is not particularly limited.

The amount coated should be preferably a thickness of, for example, about 0.5 to 5 μm, because heat perforatability during stencil preparation will be lowered if the amount is too much, while problems occur in the adhesive force if it is too small.

Of course, the above coating should preferably be conducted at a temperature at which the adhesive has sufficient coating characteristics, for example, under temperature rises of about 50 to 100° C.

After coating of the above ionizing-radiationcurable adhesive, the adhesive becomes non-fluid by cooling, and said adhesive layer retains some adhesiveness or tackiness due to the presence of the monomer, and both are laminated under this state.

By curing the adhesive layer by irradiation of an ionizing-radiation from the thermoplastic film layer 3 side or the base 1 side while performing lamination or after lamination, the heat-sensitive stencil sheet according to the first embodiment of the present invention is obtained.

As the ionizing-radiation to be used, electron beam and UV-ray may be preferably used, but when UV-ray is to be used, it is necessary to formulate a photopolymerization initiator in the above adhesive.

When electron beam is to be used, electron beam may be irradiated from either surface of the above laminated product, and when UV-ray is to be used, at least one of the base 1 and the thermoplastic film 3 is required to be transparent, and it is irradiated from the transparent side.

For irradiation of radiation, the prior art technique can be used as such. For example, in the case of electron beam curing, there may be employed electron beams having an energy of 50 to 1,000 KeV, preferably 100 to 300 KeV, released from various electron beam accelerators such as the Cocklofwalton type, the Vandegraph type, the coooscillation transformation type, the insulating core transformer type, the linear type, the electron curtain type, the dynamitron type, the high frequency type, etc. In the case of UV-ray curing, UV-ray generated from a light source such as ultra-high pressure mercury lamp, high pressure mercury lamp, low pressure mercury lamp, carbon arc, xenon arc, metal halide lamp, etc., can be utilized.

Although any irradiation method may be useful for the present invention, electron beam irradiation is more preferable for curing speed of the adhesive layer, adhesiveness of the adhesive layer or other reasons.

Sticking prevention layer

In forming stencil holes by heating the thermoplastic film layer 3 by a heating printing means such as thermal head, etc., depending on the conditions, there may be the fear that the thermal head may stick to the thermoplastic film layer 3 to destroy the thermoplastic film layer 3, or in the case of forming stencil holes by exposure through a positive original film, that the positive original film may be stuck.

The sticking prevention layer eliminates the above drawbacks, and as shown in FIG. 2, a sticking prevention layer 4 is formed on the thermoplastic film layer 3. The sticking prevention layer 4 is required to be meltable by heating and also non-sticky. As such resin meltable by heating, for example, there can be employed fluorine resins such as polytetrafluoroethylene, polychlorotrifluoroethylene, tetrafluoroethylenehexafluoroethylene copolymer, polyvinylidene fluoride, etc., epoxy resins, melamine resins, phenol resins, polyimide resins, polyvinyl acetal resins, polyvinyl butyral resins, polyoxyethylene terephthalate, polyethylene oxide resins, etc. Further, for the purpose of improving slidability of the sticking prevention layer 4 formed, a surfactant, for example, a fatty acid metal salt such as a metal salt of stearic acid, palmitic acid, lauric acid, oleic acid, etc. with lithium, potassium, sodium, calcium, barium, aluminum, etc., a phosphate ester type surfactant, a polyoxyethylene type surfactant, or a surfactant such as mono-, di-alkyl phosphate, tri(polyoxyethylene-alkylether)phosphate, etc. may be preferably added at a proportion of about 10 to 200 parts by weight per 100 parts by weight of the above resin to form the sticking prevention layer 4.

The sticking prevention layer 4 comprising the above resin (and the surfactant) may be formed by dissolving or dispersing these materials in an organic solvent or water to prepare a coating liquid and applying this onto the surface of the thermoplastic film layer 3 according to any desired method. The thickness of the sticking prevention layer 4 should be preferably thinner, for example, about 0.1 to 10 μm, since if it is too thick, the heat sensitivity will be lowered to make formation of perforations insufficient. The timing when the sticking prevention layer 4 is formed is not particularly limited, but may be either after or during formation of the heat-sensitive stencil sheet of the above first invention, or it may also be formed on the raw fabric of the thermoplastic film.

The above sticking prevention layer in the present invention may preferably comprise a material which is meltable by heating and has a melting point of 40° C. or higher.

In addition to the embodiments as described above, the following embodiments can be particularly preferably employed as the sticking prevention layer in the present invention.

(1) One in which the sticking prevention layer comprises a modified product of a silicone resin. Such silicone modified resin has excellent effect in improving lubricity, running performance, conveyability together with the sticking prevention effect.

(2) One in which the sticking prevention layer comprises a resin obtained by introducing urethane bonds, ester bonds, ether bonds or amide bonds into a silicone resin.

(3) One in which the sticking prevention layer comprises a resin, preferably a crystalline polymer, obtained by modifying a silicone resin with a polyester, polycarbonate, polyether or epoxy resin.

Such modified resin improves adhesiveness with PET film and solubility, and also has excellent effect in reducing head dregs which are liable to be generated on the thermal head. Also, for reducing head dregs, it is effective to restrict the amount coated to 0.1 to 0.01 $g/m^2$.

(4) One in which the sticking prevention layer has a further antistatic property.

(5) One in which an antistatic layer is formed on the sticking prevention layer.

Imparting of antistatic property

Ordinarily, the thermoplastic film layer of a heat-sensitive stencil sheet is liable to be charged, and there may sometimes ensue the problem that the printing paper sticks onto the paper after stencil preparation during printing, so that smooth printing cannot be performed.

The sticking prevention layer as described above has antistatic effect to some extent, but when further antistatic property is demanded, it is possible to formulate a surfactant which has been generally deemed to have an antistatic effect, selected from among anionic carboxylates, sulfonates, phosphoric acid derivatives, cationic alkylamines, amideamines, quaternary ammonium salts, nonionic polyhydric alcohols, polyhydric alcohol esters, ethylene oxide adducts of higher alcohol, alcoholphenol, fatty acid, amide, amine, etc., amphoteric carboxylate type (guanidine salt, betaine salt, imidazoline type, amide type, diamine type, etc.), which is solid at normal temperature (20° C.) at a proportion of 200 parts by weight or less based on 100 parts of the above non-sticky sticking prevention layer. If it exceeds 200 parts by weight, storage stability and coatable gas will be undesirably lost.

The sticking prevention layer 4 composed mainly of the above surfactant may be formed by dissolving or dispersing these materials in an organic solvent or water to prepare a coating liquid and applying this onto the surface of the thermoplastic film layer 3 according to any desired method.

Also, for imparting excellent antistatic property to the paper, it is possible to form further an antistatic layer on the sticking prevention layer 4. The antistatic layer is formed of a surfactant having the above antistatic effect as the main component. Also, for improvement of durability of that layer, a thermoplastic resin or a modified product of silicone resin as described for the sticking prevention layer can be used with a binder of 100 parts by weight, mixed at a ratio of 200 parts by weight or less of the antistatic agent. The thickness of such antistatic layer may be preferably within the range of 0.01 μm to 5 μm. With a thickness less than 0.10 μm, there is substantially no antistatic ability, while if it exceeds 5 μm, stencil preparation sensitivity will be lowered similarly as in the case of the sticking prevention layer. Most preferably, the thickness is in the range of 0.05 to 1 μm.

In the following, the present invention is described in more detail by referring to Examples, Comparative Examples and Use Examples In the sentences, parts or % is based on weight unless otherwise noted.

EXAMPLES A-1 to A-4

Polyurethane resin synthesized from dipropylene glycol (1 mol), TDI (2 mol), 1-butanol (1.05 mol) and 2-propanol (1.05 mol): 7.25 parts Acrylate monomer (Allonix M5700, produced by Toa Gosei, Japan) 27.5 parts The above components were melted and mixed at 85° to 90° C. to prepare an ionizing radiation curable adhesive having a viscosity of 700 cps at 85° C. The ionizing radiation curable adhesive is non-fluidizable at 25° C., and has some tackiness The above adhesive curable by ionizing radiation was applied on the surface of a PET film having various properties shown below in Table 1 according to the direct method at 80 to 90° C. at a ratio of 1.0 g/m$^2$, and a porous tissue paper (PVO39, produced by Krampton Co., 10.8 g/m$^2$) was laminated on the coated surface by means of a cooled laminator, followed by irradiation of an electron beam of 5 Mrad to obtain a heat-sensitive stencil sheet of the present invention.

On the opposite surface of the PET film used above, a sticking prevention layer with a thickness of 0.1 μm comprising a mixture of a thermoplastic resin (Vyron 200, produced by Toyobo, Japan) and a surfactant (Gafac RL-210) at a weight ratio of 33:67 was previously formed.

EXAMPLE A-5

In place of the adhesive curable by ionizing radiation in Example A-1, an adhesive curable by ionizing radiation having the following composition was used, and following otherwise the same procedure as in Example A-1, a heat-sensitive stencil sheet of the present invention was obtained.

Polyurethane resin synthesized from 1,3-butanediol (1 mol), TDI (2 mol), isopropanol (1.05 mol), 1-butanol (1.05 mol): 72.5 parts Allonix M-5700 27.5 parts viscosity 800 cps (85° C.)

EXAMPLE A-6

In place of the adhesive curable by ionizing radiation in Example A-1, an adhesive curable by ionizing radiation having the following composition was used, and following otherwise the same procedure as in Example A-1, a heat-sensitive stencil sheet of the present invention was obtained.

Polyethylene resin synthesized from polypropylene glycol MW 200 (1 mol), TDI (2 mol), isopropanol (1.18 mol) and 2-hydroxyethyl acrylate (0.25 mol): 80 parts Allonix M-5600 20 parts

COMPARATIVE EXAMPLES A-1 to A-3

Except for laminating with a porous tissue paper by using a polyvinyl acetate emulsion type adhesive as the adhesive at a coated amount of 2.0 g./m$^2$, heat-sensitive stencil sheets of the Comparative Examples were obtained in the same manner as in Examples.

COMPARATIVE EXAMPLE A-4

Except for laminating with a porous tissue paper by using a thermosetting urethane type resin as the adhesive at a coated amount of 2.0 g./m$^2$, the heat-sensitive stencil sheet of the Comparative Example was obtained.

TABLE 1

| | PET Film Properties | | | |
|---|---|---|---|---|
| | I | II | III | IV |
| Example A-1 | 2.0 | 5.6 | 241 | 7.0 |
| Example A-2 | 2.0 | 22.0 | 260 | 9.5 |
| Example A-3 | 1.5 | 4.0 | 255 | 5.2 |
| Example A-4 | 2.0 | 16.0 | 233 | 5.7 |
| Example A-5 | 2.0 | 5.6 | 241 | 7.0 |
| Comp. Exam. A-1 | 2.0 | 1.5 | 260 | 9.0 |
| Comp. Exam. A-2 | 2.0 | 3.5 | 260 | 11.0 |
| Comp. Exam. A-3 | 2.0 | 5.6 | 241 | 7.0 |
| Comp. Exam. A-4 | 2.0 | 5.6 | 241 | 7.0 |

I: thickness (μm)
II: heat shrinkage (%)
III: melting point (°C.)
IV: melting heat content (cal/g)

Heating shrinkage was measured for a test strip of 200 mm×200 mm under the conditions of 150° C. and 15 minutes, and represented as an average value of MD and TD.

USE EXAMPLE

The sheets of Examples and Comparative Examples were perforated under the conditions shown below and stencil printing, was performed by use of the sheets to obtain the results shown in Table 2.

Printing: running speed 3 msec./line, heat content 0.16 mJ

Printing machine Ricoh Preport SS870, printing speed 3 speeds

Evaluation was conducted according to the following methods.

Density: Macbeth densitometer Optical Density (O.D.)

Resolving power: evaluation when 10 lines/mm of the test chart of Society of Electrophotography was printed:

O=discrimination of lines can be easily performed

Δ=discrimination is possible, although lines are sometimes cut or run together x=no discrimination of lines is possible Printing resistance: number of printed sheets wherein no sticking appears Pore area: pore area of printing paper when the area of one dot of thermal head is made 100%

Overall evaluation: the above items are summarized

O=satisfactory as a whole

Δ=partially unsatisfactory x=unsatisfactory as a whole

TABLE 2

| | Properties of heat-sensitive stencil sheets | | | | |
|---|---|---|---|---|---|
| | O.D. | Pore area (%) | Resolving power | Printing resistance (sheets) | Overall evaluation |
| Example A-1 | 1.2 | 50 | O | 4,000 | O |
| Example A-2 | 1.5 | 65 | O | 4,000 | O |
| Example A-3 | 1.3 | 54 | O | 4,000 | O |
| Example A-4 | 1.4 | 62 | Δ | 4,000 | O |
| Example A-5 | 1.2 | 50 | O | 4,000 | O |
| Example A-6 | 1.2 | 46 | O | 4,000 | O |
| Comp. Exam. A-1 | 0.9 | 27 | Δ | 2,000 | Δ-x |

TABLE 2-continued

| | Properties of heat-sensitive stencil sheets | | | | |
|---|---|---|---|---|---|
| | O.D. | Pore area (%) | Resolving power | Printing resistance (sheets) | Overall evaluation |
| Comp. Exam. A-2 | 0.8 | 24 | Δ | 2,000 | Δ-x |
| Comp. Exam. A-3 | 1.0 | 32 | x | 2,000 | x |
| Comp. Exam. A-4 | 0.9 | 30 | Δ | 1,500 | x |

EXAMPLE B-1

| | |
|---|---|
| Polyester resin (Polyester TP-219, produced by Nippon Gosei Kagaku, Japan) | 46.7 parts |
| Acrylate monomer (Allonix M5700, produced by Toa Gosei, Japan) | 23.2 parts |
| Aliphatic polyester oligomer (Nipporane 4056, produced by Nippon Polyurethane, Japan) | 30.0 parts |

The above components were melted and mixed at 85° to 90° C. to prepare an adhesive curable by ionizing radiation and having a viscosity at 85° C. of 1,250 cps. The ionizing-radiation-curable adhesive is non-fluidizable at 25° C., having some tackiness.

The above adhesive curable by ionizing radiation was applied on the surface of a polyethylene terephthalate film with a thickness of 2 μm at 85 to 90° C. according to the direct method at a ratio of 1.5 g.m/$^2$, then a stencil paper K (produced by Nippon Shigyo, 10.5 g.m/$^2$) was laminated on the coated surface by use of a cooled laminator, and then an electron beam of 5 Mrad was irradiated to give a heat-sensitive stencil sheet of the present invention.

With a black-and-white positive image film superposed on the surface of the thermoplastic film layer of the above heat-sensitive stencil sheet, a flash light was irradiated to prepare a stencil, which was then subjected to a stencil printer to give a printed matter having sufficient printing resistance and resolving power.

EXAMPLE B-2 to B-4 AND COMPARATIVE EXAMPLE B-1

Heat-sensitive stencil sheets of the present invention and Comparative Example were obtained in the same manner as in Example B-1 except for using an ionizing-radiation-curable adhesive having the following composition in place of the ionizing-radiation-curable adhesive in Example B-1.

| | |
|---|---|
| Example B-2 | |
| Polyester TP219 | 40 parts |
| Allonix M5700 | 20 parts |
| Nipporane 4056 | 30 parts |
| Diethyleneglycol dimethacrylate | 1 part |
| Viscosity 800 cps (85° C.) | |
| Example B-3 | |
| Polyester TP219 | 50 parts |
| Allonix M5700 | 50 parts |
| β-Mercaptopropionic acid | 0.005 part |
| Viscosity 900 cps (85° C.) | |
| Example B-4 | |
| Polyester TP219 | 40 parts |
| Allonix M5700 | 20 parts |
| Aliphatic polyester oligomer (Nipporane N4009, produced by Nippon Polyurethane, Japan) | 30 parts |
| Ethyleneglycol diacrylate | 0.5 part |
| Viscosity 900 cps (85° C.) | |

-continued

| | |
|---|---|
| Comparative Example B-1 | |
| Polyester TP219 | 50.0 parts |
| Allonix M5700 | 33.3 parts |
| Bifunctional urethane acrylate (Diabeam UK6034, produced by Mitsubishi Rayon, Japan) | 16.7 parts |
| Viscosity 900 cps (85° C.) | |

On the thermoplastic film layer of the heatsensitive stencil sheet of the present invention obtained in Example B-1, a sticking prevention layer with a thickness of 0.1 to 0.2 g/m'was formed from the following composition to give a heat-sensitive stencil sheet having a sticking prevention layer of the present invention.

| | |
|---|---|
| Polyvinyl butyral (Ethlec BX-1, produced by Sekisui Kagaku, Japan) | 50 parts |
| Surfactant (Plysurf 208, produced by Daiichi Kogyo Yakuhin, Japan) | 50 parts |
| Toluene | 450 parts |
| Methyl ethyl ketone | 450 parts |

When stencil preparation and printing were performed by means of Rocoh Reporter SS 870 by use of the above heat-sensitive stencil sheet, there occurred no trouble due to sticking of the thermal head, and a good printed matter could be obtained with excellent printing resistance.

EXAMPLE B-6

On the thermoplastic film layer of the heat-sensitive stencil sheet of the present invention obtained in Example B-2, a sticking prevention layer with a thickness of 0.1 to 0.2 g.m/$^2$ was formed from the following composition to give a heat-sensitive stencil sheet having a sticking prevention layer of the present invention.

| | |
|---|---|
| Acrylate (Sumipeck B-MHO, produced by Sumitomo Kagaku, Japan) | 50 parts |
| Surfactant (Electrostripper AC, produced by Kao, Japan) | 50 parts |
| Toluene | 450 parts |
| Methyl ethyl ketone | 450 parts |

When stencil preparation and printing were performed by means of Rocoh Reporter SS 870 by use of the above heat-sensitive stencil sheet, there occurred no trouble due to sticking of the thermal head, and a good printed matter could be obtained with excellent printing resistance.

EXAMPLE B-7

On the thermoplastic film layer of the heatsensitive stencil sheet of the present invention obtained in Example B-3, a sticking prevention layer with a thickness of 0.1 to 0.2 g/m$^2$ was formed from the following composition to give a heat-sensitive stencil sheet having a sticking prevention layer of the present invention.

| | |
|---|---|
| Acrylate (Sumipeck B-MHO, produced by Sumitomo Kagaku, Japan) | 50 parts |
| Surfactant (Emulgen 108, produced by Kao, Japan) | 50 parts |
| Toluene | 450 parts |
| Methyl ethyl ketone | 450 parts |

When stencil preparation and printing were performed by means of Rocoh Reporter SS 870 by use of the above heat-sensitive stencil sheet, there occurred no trouble due to sticking of the thermal head, and a good printed matter could be obtained with excellent printing resistance.

EXAMPLES D-1 and D-3

Heat-sensitive stencil sheets of the present invention were prepared in the same manner as in Example B-5 except for using sticking prevention layers comprising the following compositions in place of the sticking prevention layer in Example B-5.

EXAMPLE D-1

| | |
|---|---|
| Polyethylene glycol 6000 (produced by Wako Junyaku Kogyo, Japan) | 2 mol |
| Silicone type diol (X-22-160AS produced by Shinetsu Kagaku Kogyo, Japan) | 1 mol |
| 4,4'-Diphenylmethane diisocyanate (produced by Nippon Polyurethane Kogyo, Japan) | 2 mol |

With the above formulation ratio, and by use of dibutyltin laurate as the catalyst, the reaction was carried out at 60° C. in methyl ethyl ketone, and then the reaction mixture was diluted to 1.25 wt% to provide a sticking prevention agent. This was coated and dried on a thermoplastic film by Myer bar No.10.

EXAMPLE D-2

| | |
|---|---|
| Polyester diol (PlaxelH-1P, produced by Dicel Kagaku Kogyo K.K., Japan) | 1.3 mol |
| Silicone type diol (X-22-160AS produced by Shinetsu Kagaku Kogyo K.K., Japan) | 1.0 mol |
| 4,4'-Diphenylmethane diisocyanate (Produced by Nippon Polyurethane | 1.15 mol |

-continued

| |
|---|
| Kogyo K.K., Japan) |

The same experiment as in Example D-1 was practiced.

EXAMPLE D-3

Preparation was performed in the same manner as in Example D-2 except for adding 20 parts of Antistecks C-200X as the antistatic agent per 100 parts to provide a sticking prevention agent.

REFERENCE EXAMPLES D-1 to D-3

For the purpose of comparing the functions of the sticking prevention layers, those having the sticking prevention layers shown below were prepared, and their characteristics were examined.

REFERENCE EXAMPLE 1

(no sticking prevention layer formed)

REFERENCE EXAMPLE 2

| Sticking prevention layer | |
|---|---|
| Phosphate type surfactant (Plysurf A208S, produced by Daiichi Kogyo Seiyaku, Japan, m.p. 7° C.) | 1 part |
| Toluene | 40 parts |
| Methyl ethyl ketone | 40 parts |
| (coating thickness on drying 0.1 μm) | |

REFERENCE EXAMPLE 3

| | |
|---|---|
| Gafac RL-210 | 1 part |
| Vyron 2000 | 5 parts |
| Toluene | 240 parts |
| Methyl ethyl ketone | 240 parts |
| (coating thickness on drying 0.1 μm) | |

TABLE 3

| | Properties of Sheet | | | | |
|---|---|---|---|---|---|
| | Antisticking property | | Lubricity*4 | Chargeability (mV*3) | |
| Example | Initial stage*1 | Durability*2 | (degree) | Initial stage | After 6 months |
| Example D-1 | O | O | 8 | 350 | 400 |
| Example D-2 | O | O | 9 | 500 | 550 |
| Example D-3 | O | O | 7 | 100 | 160 |
| Ref. Exam. D-1 | x | — | 15 | 950 | 950 |
| Ref. Exam. D-2 | O | 3 months | 40 | 300 | 700 |
| Ref. Exam. D-3 | x | — | 20 | 530 | 870 |

*1 Antisticking property when stencil is prepared with a thermal head under an application voltage of 0.13 mJ
O: no sticking occurs
x: sticking occurs
*2 The term when no sticking occurs when stencil is prepared with a thermal head under an application voltage of 0.13 mJ
O: no change with lapse of time
*3 Charged potential, when compulsorily charged under an application voltage of 4 KV for one minute
*4 Represented by the angle when a weight of 50 g is placed on the PET film on which the sticking prevention layer is formed by coating and slides down when it is slanted.

INDUSTRIAL APPLICABILITY

The heat-sensitive stencil sheet of the present invention can be applied widely as the heat-sensitive stencil sheet to be used for the stencil preparation method by use of a printing perforation system using a heating printing means such as a thermal head.

We claim:

1. A heat-sensitive stencil sheet, comprising a thermoplastic film laminated through an adhesive layer on one surface of a porous base, said adhesive layer comprising an ionizing-radiation-curable adhesive formed without solvent.

2. A heat-sensitive stencil sheet according to claim 1, wherein said ionizing radiation curable adhesive is meltable by heating.

3. A heat-sensitive stencil sheet according to claim 1, wherein said ionizing-radiation-curable adhesive comprises a composition containing (a) a thermoplastic resin and (b) a monomer and/or a low melting wax.

4. A heat-sensitive stencil sheet according to claim 1, wherein said ionizing-radiation-curable adhesive contains a thermoplastic resin having a molecular weight of 1,000 to 30,000 and a low melting wax having a melting point of 40 to 150° C.

5. A heat-sensitive stencil sheet according to claim 3, wherein said thermoplastic resin is selected from the group consisting of polyester, polyurethane, polycarbonate, epoxy resin, polyolefin, polyvinyl acetate, polyacrylate and polystyrene having molecular weights of 400 to 10,000.

6. A heat-sensitive stencil sheet according to claim 3, wherein said thermoplastic resin comprises an amorphous resin having a softening point of 40 to 300° C.

7. A heat-sensitive stencil sheet according to claim 1, wherein said ionizing-radiation-curable adhesive is non-fluidizable at normal temperature, and exhibits fluidizability under elevating temperature conditions.

8. A method of making a heat-sensitive stencil sheet, sequentially comprising the steps of coating a surface of a thermoplastic film with an ionizing-radiation-curable adhesive, laminating a porous base on the coated surface, and irradiating said adhesive with an ionizing radiation to integrate said thermoplastic film and said porous base together by adhesion.

9. The method of claim 8, wherein said coating of said adhesive is performed under elevated temperature conditions and said laminating of the porous base is performed under low temperature conditions.

10. A heat-sensitive stencil sheet according to claim 1, wherein said thermoplastic film comprises a polyethyleneterephthalate film having a thickness of 1 to 10 μm.

11. A heat-sensitive stencil sheet according to claim 1, wherein said thermoplastic film has a heat shrinkage of 3 to 30% when heated at 150° C. for 15 minutes.

12. A heat-sensitive stencil sheet according to claim 1, wherein the melting heat content of said thermoplastic film is 5 to 10 cal/g and its melting point is 270° C. or lower.

13. A heat-sensitive stencil sheet according to claim 1, wherein said porous base comprises a porous material having a wet tensile strength of 200 g/15 mm or higher.

14. A heat-sensitive stencil sheet according to claim 13, wherein said porous base comprises a natural fiber.

15. A heat-sensitive stencil sheet according to claim 13, wherein said porous base comprises a mixed paper made from a natural fiber and a synthetic fiber.

16. A heat-sensitive stencil sheet according to claim 1, wherein a sticking prevention layer is formed on a surface of said thermoplastic film opposing the surface on which the porous base is laminated.

17. A heat-sensitive stencil sheet according to claim 16, wherein said sticking prevention layer comprises a thermoplastic resin which is meltable by heating and has a melting point of 40° C. or higher.

18. A heat-sensitive stencil sheet according to claim 16, wherein said sticking prevention layer comprises a modified product of a silicone resin.

19. A heat-sensitive stencil sheet according to claim 16, wherein said sticking prevention layer comprises a resin modified by insertion of urethane bonds, ester bonds, ether bonds or amide bonds into a silicone resin.

20. A heat-sensitive stencil sheet according to claim 16, wherein said sticking prevention layer comprises a resin obtained by modifying a silicone resin with a polyester, polycarbonate, polyether or epoxy resin.

21. A heat-sensitive stencil sheet according to claim 16, wherein said sticking prevention layer has an antistatic property.

22. A heat-sensitive stencil sheet according to claim 16, wherein an antistatic layer is formed on said sticking prevention layer.

23. A heat-sensitive stencil sheet according to claim 1, wherein at least one of said porous base, thermoplastic film and adhesive layer has an antistatic property.

* * * * *